US012598109B2

(12) United States Patent
Singh et al.

(10) Patent No.: US 12,598,109 B2
(45) Date of Patent: Apr. 7, 2026

(54) NETWORK PERFORMANCE EVALUATION USING AI-BASED NETWORK CLONING

(71) Applicant: SAMSUNG ELECTRONICS CO., LTD., Suwon-si (KR)

(72) Inventors: Sukhdeep Singh, Bangalore (IN); Joseph Thaliath, Bangalore (IN); Sandeep Kumar Jaisawal, Bangalore (IN); Seungil Yoon, Suwon-si (KR); Ashish Jain, Bangalore (IN); Avinash Bhat, Bangalore (IN); Ganesh Kumar Thangavel, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 240 days.

(21) Appl. No.: 18/497,319

(22) Filed: Oct. 30, 2023

(65) Prior Publication Data

US 2024/0223458 A1    Jul. 4, 2024

(30) Foreign Application Priority Data

Jan. 3, 2023 (IN) .............................. 202341000293
Apr. 27, 2023 (IN) .............................. 202341000293

(51) Int. Cl.
*H04L 41/12* (2022.01)
*H04L 41/14* (2022.01)
(Continued)

(52) U.S. Cl.
CPC ............ *H04L 41/12* (2013.01); *H04L 41/145* (2013.01); *H04L 41/16* (2013.01); *H04L 41/5016* (2013.01)

(58) Field of Classification Search
None
See application file for complete search history.

(56) References Cited

U.S. PATENT DOCUMENTS

2019/0028347 A1*  1/2019 Johnston ............... H04L 43/026
2019/0213104 A1*  7/2019 Qadri .................. H04L 67/1097
(Continued)

FOREIGN PATENT DOCUMENTS

GB        2593726 A    10/2021
KR  1020220116899 A     8/2022
WO     2021197695 A1   10/2021

OTHER PUBLICATIONS

Indian Office Action dated Aug. 8, 2025 issued in Indian Patent Application No. 202341000293, 8 pp.

*Primary Examiner* — Schquita D Goodwin
*Assistant Examiner* — Ishrat Rashid
(74) *Attorney, Agent, or Firm* — NIXON & VANDERHYE P.C.

(57) ABSTRACT

Embodiments herein disclose a method and network apparatus for network performance evaluation using AI-based network cloning. The method includes constructing one or more AI-based network clones of one or more network nodes. The one or more AI-based network clones mimics a data pattern and cell behavior of the one or more network nodes. Further, the method includes receiving a solution predicted by an AI server to mitigate one or more problems associated with one or more services of the one or more network nodes. Further, the method includes evaluating a performance of the one or more AI-based network clones by deploying the solution on the one or more AI-based network clones. Further, the method includes sending the solution to the one or more network nodes for deployment or retraining based on the performance of the one or more AI-based network clones.

15 Claims, 10 Drawing Sheets

(51) Int. Cl.
    *H04L 41/16*         (2022.01)
    *H04L 41/5009*     (2022.01)

(56)          References Cited

U.S. PATENT DOCUMENTS

| | | | |
|---|---|---|---|
| 2019/0243737 A1* | 8/2019 | Savino | G06F 9/45558 |
| 2020/0344254 A1 | 10/2020 | Kokko et al. | |
| 2021/0042210 A1* | 2/2021 | Chang | G06F 11/3688 |
| 2023/0011004 A1* | 1/2023 | Fellows | H04L 63/1425 |
| 2024/0098100 A1* | 3/2024 | Lal | H04L 63/1491 |

* cited by examiner

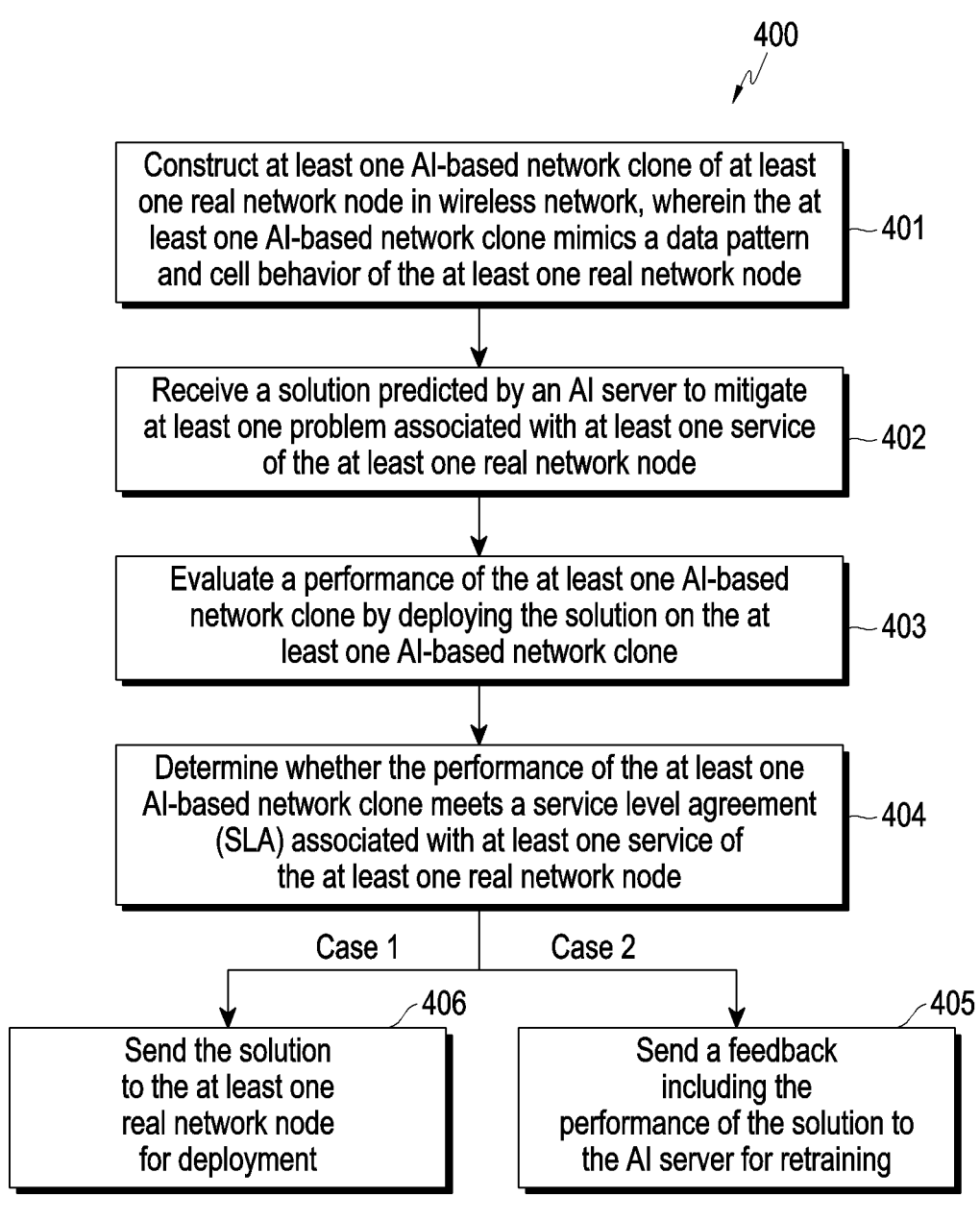

400

Construct at least one AI-based network clone of at least one real network node in wireless network, wherein the at least one AI-based network clone mimics a data pattern and cell behavior of the at least one real network node ~401

Receive a solution predicted by an AI server to mitigate at least one problem associated with at least one service of the at least one real network node ~402

Evaluate a performance of the at least one AI-based network clone by deploying the solution on the at least one AI-based network clone ~403

Determine whether the performance of the at least one AI-based network clone meets a service level agreement (SLA) associated with at least one service of the at least one real network node ~404

Case 1                              Case 2

Send the solution to the at least one real network node for deployment ~406

Send a feedback including the performance of the solution to the AI server for retraining ~405

FIG. 4

NETWORK PERFORMANCE EVALUATION USING AI-BASED NETWORK CLONING

CROSS-REFERENCE TO RELATED APPLICATIONS

The present application is based on, and claims priority under 35 U.S.C. § 119 to Indian Provisional Patent Application Number 202341000293 filed on Jan. 3, 2023, in the Indian Patent Office, and to Indian Complete Patent Application No. 202341000293, filed on Apr. 27, 2023, in the Indian Patent Office, the disclosures of each of which are incorporated by reference herein in their entireties.

BACKGROUND

Field

The disclosure relates to a wireless communication system, and for example, to a method and network apparatus for network performance evaluation.

Description of Related Art

Generally, troubleshooting network anomalies is an essential part of wireless technologies to troubleshoot including, but not limited to, network congestion, network load imbalance, handover prediction issues and MAC scheduling issues. For troubleshooting an Artificial Intelligence (AI) model or a Machine Learning (ML) model are used to understand the patterns of the network to determine network anomaly in advance. An operator takes a decision based on the determined network anomaly.

In conventional systems and methods, an AI server determines network anomaly mitigation solutions for the determined network anomaly using the AI or ML models. The network anomaly mitigation solutions are directly implemented in a wireless network. The wireless technologies such as a New Radio (NR) and a Long Term Evolution (LTE), provide hundreds of services to users, and implementing the network anomaly mitigation solutions affects most of the services. The services include, but are not limited to, data speed, latency, reliability, Operational Expenditure (OPEX), Quality of service (QOS), Quality of Experience (QoE), and Service Level Agreement (SLA). The services are affected due to the implementation of non-optimal network anomaly mitigation solutions.

Thus, it is desired to address the above-mentioned disadvantages or other shortcomings or at least provide a useful alternative with an intelligent and proactive platform.

SUMMARY

Embodiments of the disclosure provide a method and a network clone apparatus for network performance evaluation using AI-based network cloning.

Embodiments of the disclosure create an AI-based network clone that mimics a data pattern and cell behavior of the network nodes.

Embodiments of the disclosure evaluate a performance of the AI-based network clone by deploying a solution on the AI-based network clone.

Embodiments of the disclosure send a feedback including the performance of the solution to the AI server for retraining when the performance of the AI-based network clone does not meet a SLA associated with a service of the network nodes.

Accordingly, example embodiments herein disclose a method for network performance evaluation using AI-based network cloning. The method includes constructing, by a network apparatus, one or more AI-based network clones of one or more network nodes in a wireless network. The one or more AI-based network clones are configured to mimic a data pattern and cell behavior of the one or more network nodes. The method includes receiving, by the network apparatus, a solution predicted by an AI server to mitigate one or more problems associated with one or more services of the one or more network nodes. The method includes evaluating, by the network apparatus, a performance of the one or more AI-based network clones by deploying the solution on the one or more AI-based network clones. The method includes determining, by the network apparatus, whether the performance of the one or more AI-based network clones meet a SLA associated with one or more services of the one or more network nodes. The method includes sending the solution to the one or more network nodes for deployment based on the performance of the one or more AI-based network clones meeting the SLA associated with one or more services of the one or more network nodes. The method includes sending a feedback including the performance of the solution to the AI server for retraining based on the performance of the one or more AI-based network clones not meeting the SLA associated with one or more services of the one or more network nodes.

According to an example embodiment, the method includes receiving, by the network apparatus, a request to create the one or more AI-based network clones from the AI server upon detecting the one or more problems associated with one or more services of the one or more network nodes. The method includes obtaining, by the network apparatus, real-time data from the one or more network nodes. The real-time data is associated with to the one or more services of the one or more network nodes to be evaluated. The method includes generating, by the network apparatus, the data pattern of the one or more services to be evaluated by applying a second AI model on the real-time data. The data pattern includes one or more of a traffic pattern, a number of users, and an amount of data traffic for different services. The method includes generating, by the network apparatus, the cell behavior of the one or more services to be evaluated by applying a third AI model the real time data. The method includes creating, by the network apparatus, the one or more AI-based network clones of the one or more network nodes in the wireless network based on one or more of the data pattern and the cell the behavior.

According to an example embodiment, the method includes obtaining, by the AI server, real-time data from the one or more network nodes. The real time data related to the one or more problems associated with the one or more services of the one or more network nodes. The method includes predicting, by the AI server, the solution to mitigate the one or more problems associated with the one or more services of the one or more network nodes by applying a first AI model on the real-time data obtained from the one or more network nodes. The method includes sending, by the AI server, the solution to the network apparatus for evaluation.

According to an example embodiment, the method includes deconstructing the AI based one or more AI-based network clones of the one or more network nodes when the solution is sent to the one or more network nodes for deployment.

According to an example embodiment, the network apparatus is deployed in one or more of an independent network servers, an ORAN server, and a SON server.

Accordingly, example embodiments herein disclose the network apparatus for network performance evaluation using AI-based network cloning. The network apparatus includes a memory; and at least one processor coupled to the memory. The at least one processor is configured to receive the solution predicted by the AI server to mitigate one or more problems associated with one or more services of the one or more network nodes. The at least one processor is configured to evaluate the performance of the one or more AI-based network clones by deploying the solution on the one or more AI-based network clones. The at least one processor is configured to determine whether the performance of the one or more AI-based network clones meet the SLA associated with one or more services of the one or more network nodes. The at least one processor is configured to send the solution to the one or more network nodes for deployment based on the performance of the one or more AI-based network clones meeting the SLA associated with one or more services of the one or more network nodes. The at least one processor is configured to send the feedback including the performance of the solution to the AI server for retraining based on the performance of the one or more AI-based network clones not meeting the SLA associated with one or more services of the one or more network nodes.

Accordingly, example embodiments herein disclose a non-transitory computer-readable storage medium storing instructions which, when executed by at least one processor of a network apparatus, causes the network apparatus to perform operations. The operations comprise constructing at least one AI-based network clone of at least one network node in a wireless network. The at least one AI-based network clone is configured to mimic a data pattern and cell behavior of the at least one network node. The operations comprise receiving a solution predicted by an AI server to mitigate at least one problem associated with at least one service of the at least one network node. The operations comprise evaluating a performance of the at least one AI-based network clone by deploying the solution on the at least one AI-based network clone. The operations comprise determining whether the performance of the at least one AI-based network clone meets a Service Level Agreement (SLA) associated with at least one service of the at least one network node. The operations comprise sending the solution to the at least one network node for deployment based on the performance of the at least one AI-based network clone meeting the SLA associated with at least one service of the at least one network node. The operations comprise sending a feedback including the performance of the solution to the AI server for retraining based on the performance of the at least one AI-based network clone not meeting the SLA associated with at least one service of the at least one network node.

These and other aspects of the various example embodiments herein will be better appreciated and understood when considered in conjunction with the following description and the accompanying drawings. It should be understood, however, that the following descriptions, while indicating various example embodiments and numerous specific details thereof, are given by way of illustration and not of limitation. Many changes and modifications may be made within the scope of the embodiments herein and the embodiments herein include all such modifications.

BRIEF DESCRIPTION OF THE DRAWINGS

Various embodiments of the disclosure are illustrated in the accompanying drawings, throughout which like reference letters indicate corresponding parts in the various figures. Further, the above and other aspects, features and advantages of certain embodiments of the present disclosure will be more apparent from the following detailed description, taken in conjunction with the accompanying drawings, in which:

FIG. 4 is a flowchart illustrating an example method for evaluating network performance, according to various embodiments;

DETAILED DESCRIPTION

Figure 1:
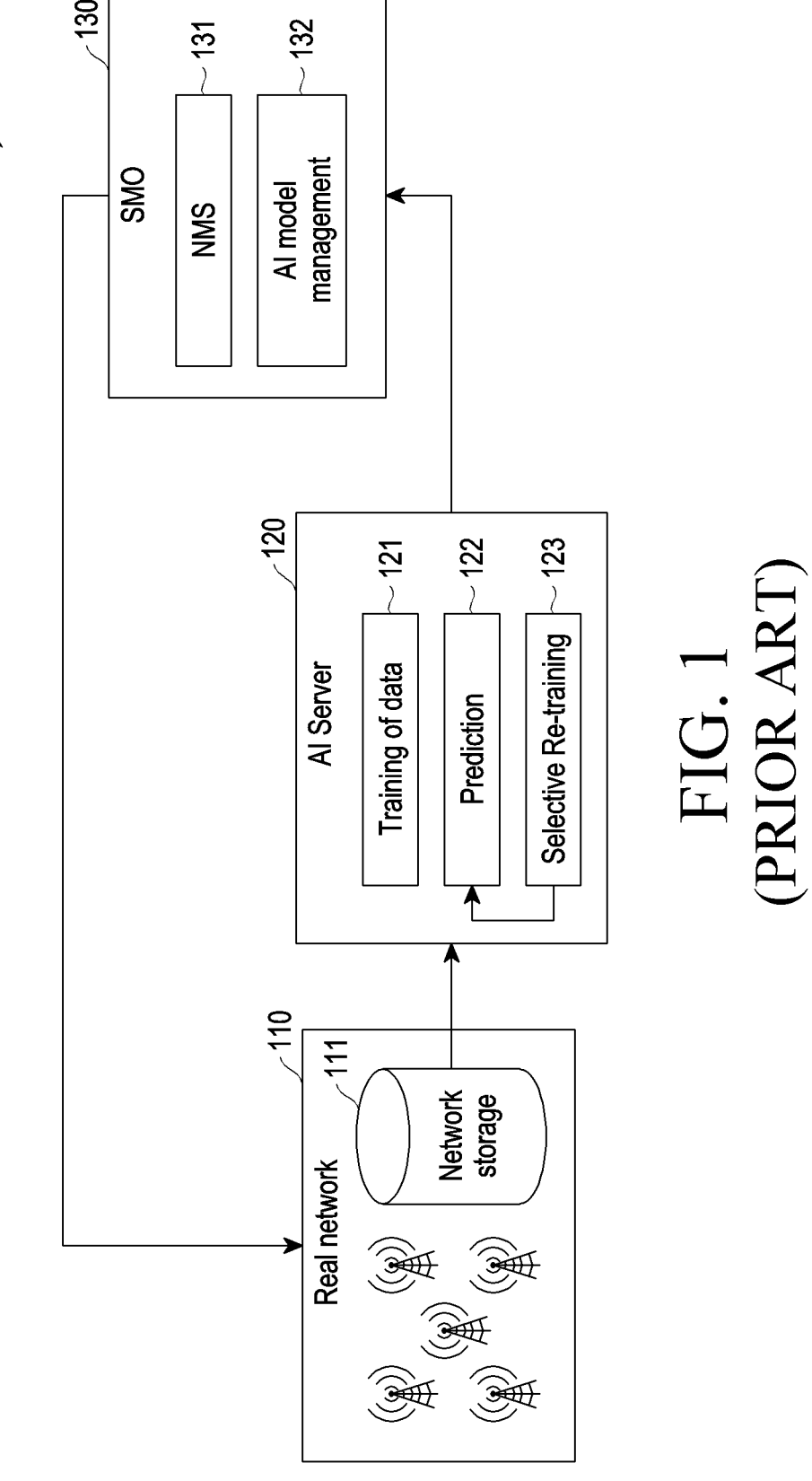
FIG. 1 is a diagram illustrating a management of network anomalies in a wireless network, according to the prior art.

Various example embodiments herein and the various features and advantageous details thereof are explained more fully with reference to the various non-limiting example embodiments that are illustrated in the accompanying drawings and detailed in the following description. Descriptions of well-known components and processing techniques may be omitted so as to not unnecessarily obscure the embodiments herein. The various example embodiments described herein are not necessarily mutually exclusive, as various embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Various embodiments may be described and illustrated in terms of blocks which carry out a described function or functions. These blocks, which may be referred to herein as units or modules or the like, may be physically implemented by analog or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be understood to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein disclose a method for network performance evaluation using AI-based network cloning. The method includes constructing, by a network clone apparatus, one or more AI-based network clones of one or more real network nodes in a wireless network. The one or more AI-based network clones mimics a data pattern and cell behavior of the one or more real network nodes. Further, the method includes receiving, by the network clone apparatus, a solution predicted by an AI server to mitigate one or more problems associated with one or more services of the one or more real network nodes. Further, the method includes evaluating, by the network clone apparatus, a performance of the one or more AI-based network clones by deploying the solution on the one or more AI-based network clones. Further, the method includes determining, by the network clone apparatus, whether the performance of the one or more AI-based network clones meet a Service Level Agreement (SLA) associated with one or more services of the one or more real network nodes. Further, the method includes sending the solution to the one or more real network nodes for deployment when the performance of the one or more AI-based network clones meet the SLA associated with one or more services of the one or more real network nodes. Further, the method includes sending a feedback including the performance of the solution to the AI server for retraining when the performance of the one or more AI-based network clones does not meet the SLA associated with one or more services of the one or more real network nodes.

Accordingly, the embodiments herein disclose the network clone apparatus for network performance evaluation using AI-based network cloning. The network clone apparatus includes a memory; a processor; and a network clone adaptor, coupled to the memory and the processor. The network clone adaptor is configured to receive the solution predicted by the AI server to mitigate one or more problems associated with one or more services of the one or more real network nodes. Further, the network clone adaptor is configured to evaluate the performance of the one or more AI-based network clones by deploying the solution on the one or more AI-based network clones. Further, the network clone adaptor is configured to determine whether the performance of the one or more AI-based network clones meet the SLA associated with one or more services of the one or more real network nodes. Further, the network clone adaptor is configured to send the solution to the one or more real network nodes for deployment when the performance of the one or more AI-based network clones meet the SLA associated with one or more services of the one or more real network nodes. Further, the network clone adaptor is configured to send the feedback including the performance of the solution to the AI server for retraining when the performance of the one or more AI-based network clones does not meet the SLA associated with one or more services of the one or more real network nodes.

Currently, for countries including but not limited to USA, India and China, millions of base stations and trillions of devices in the wireless network and resources for a Machine Learning (ML) model or AI model are limited. An operator has to predict network problems in the network in advance to mitigate the network problems at various parts of the countries using limited AI/ML models. The solution is derived from the predicted network problems and the solution is deployed in the wireless network to mitigate the network problems. However in the conventional systems and methods, the solution for mitigating the network problems are deployed in the wireless network directly without testing the solution or manually testing the solution. Deploying the solution in the wireless network directly without testing the solution or manually testing the solution hampers the wireless network performance including but not limited to poor Quality of Solution (QOS), Quality of Experience (QoE), high Operating Expenses (OPEX) and SLA not meet even after mitigation solution is deployed.

Unlike the conventional methods and systems, the disclosed system is intelligent and proactive to test the implications of the AI/ML models on the wireless network.

Unlike the conventional methods and systems, the disclosed system uses an AI-based network cloning concept to test an implications of the AI/ML model on the cloned network and provide the feedback to the AI server before pushing the ML/AI model based solution to real field of the wireless network.

In conventional methods and systems, the network clone is created manually by the operator to check re-configurations that are made in the wireless network. Unlike the conventional methods and systems, the disclosed method and system, create the network clone automatically when required without an intervention of the operator or network service provider. In the disclosed method and system, for different networks or different network cells, the network clone is created differently, dynamically and intelligently. Further, once the evaluation of the wireless network is done a resources used for cloning are released.

In conventional methods and systems, the network clone is created without live traffic of the wireless network. Unlike the conventional methods and systems, the disclosed method and system create the network clone after analyzing real network by various AI/ML models.

Unlike the conventional methods and systems, the disclosed system creates an intelligent performance evaluation platform for AI/ML based solutions based on the problematic network on which the AI/Ml use case is applied.

Unlike the conventional methods and systems, the disclosed system automates the process of creating AI/ML performance evaluation platform based on the real-time data and AI-based network characteristic recognition.

Unlike the conventional methods and systems, the disclosed system releases resources used for the cloned network once the performance evaluation is complete and utilizing the resources for performance evaluation of other AI/ML use cases.

Unlike the conventional methods and systems, the disclosed system uses feedback to instantiate the retraining process of particular layers of the AI model which are not performing well.

FIG. 1 is a diagram illustrating a management of network anomalies in a wireless network, according to the prior art.

In the conventional methods and systems, real time data from real network (110) are collected in a network storage (111) and the real time data is sent to an AI server (120) according to a network problem or use case to be targeted. The real time data collected is trained at 121 in the AI server (120). After the training at 121 in the AI server (120) is completed, the AI server predicts a solution at 122. At 123, the AI server (120) performs selective retraining of the AI model. In the conventional methods and systems, the solution is pushed to a Service Management and Orchestration (SMO) (130) directly without any evaluation. The SMO (130) includes a Network Management System. NMS (131) and the AI model management (132). The SMO (130) deploys the solution in the real network (110). The solution is deployed in the real network (110) without evaluation of the AI model causes un-optimized service and hamper the wireless network performance.

Figure 2:
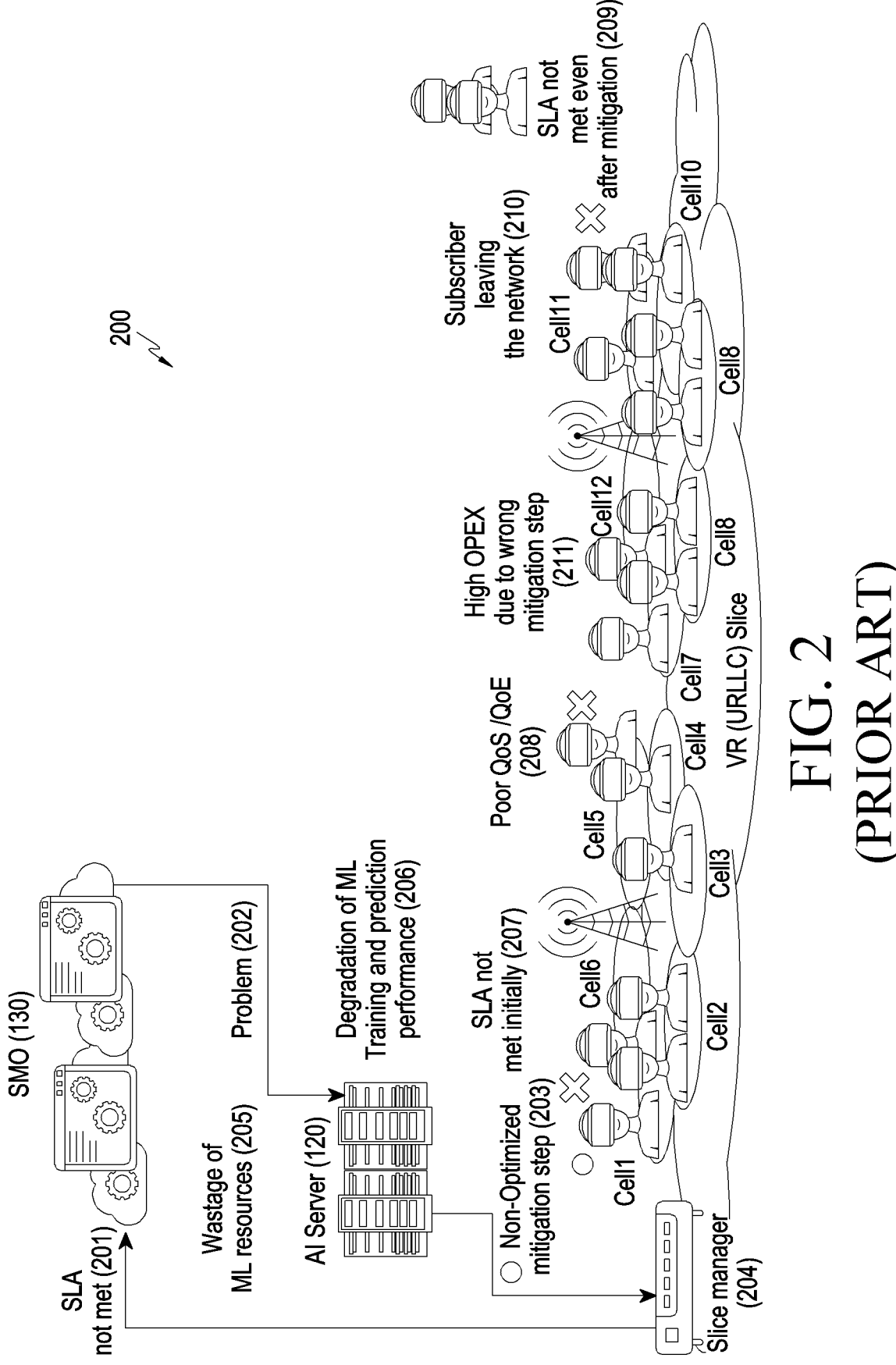
FIG. 2 is a diagram illustrating problems in the management of network anomalies in various cells of the wireless network, according to the prior art.

FIG. 2 is a diagram illustrating problems in a management of network anomalies in various cells of the wireless network, according to the prior art.

In the conventional methods and systems 200, at 201, when a SLA not meet (201) a slice manager sends the SLA not meet to the SMO (130). At 202, the SMO (130) sends the network problem to the AI server (120). At 203, the AI server (120) the network problem is analyzed, predicted and mitigation solution decided by the AI server (120). At 203, the mitigation solution is deployed in the slice manager (204) of the real network (110) or field. In the conventional methods and systems, there is no automated testing mechanism to check whether the prediction accuracies and mitigation solution is appropriate for the real network (110) or not appropriate for the real network (110).

When the prediction accuracies and mitigation solution is not appropriate for the real network (110) causes consequences in different cells (cell 1 to cell 12) including but not limited to wastage of ML resources (205), degradation of ML training and prediction performance (206), SLA not meet initially (207), poor QoS/QoE (208), high OPEX due to wrong mitigation step (211), subscriber leaving the network (210) and SLA not meet even after mitigation (209).

Referring now to the drawings and more particularly to FIGS. 3 through 8C, where similar reference characters denote corresponding features consistently throughout the figures, these are shown various example embodiments.

Figure 3:
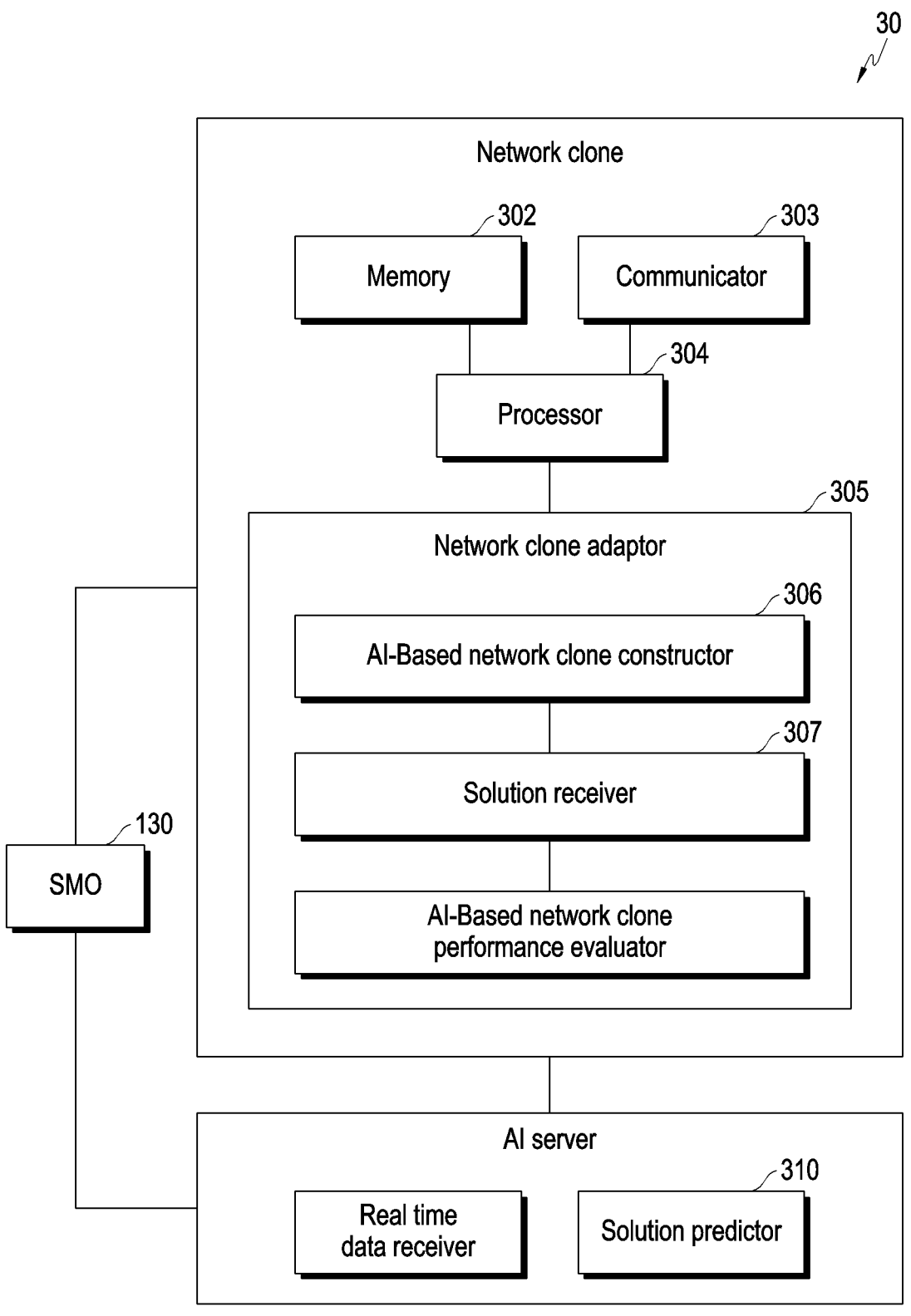
FIG. 3 is a block diagram illustrating an example configuration of a system for evaluating the network performance, according to various embodiments.

FIG. 3 is a block diagram illustrating an example configuration of a system evaluating the network performance, according to an embodiment as disclosed herein.

In an embodiment, the system (300) includes a network clone apparatus (301), an SMO (130), and an AI server (120). The network clone apparatus (301) includes a memory (302), a processor (e.g., including processing circuitry) (304) a communicator (e.g., including communication circuitry) (303), and a network clone adaptor (e.g., including various processing circuitry and/or executable program instructions) (305).

The memory (302) stores instructions to be executed by the processor (304) for evaluating network performance. The memory (302) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (302) may, in some examples, be considered a non-transitory storage medium. The term "non-transitory" may indicate that the storage medium is not embodied in a carrier wave or a propagated signal. However, the term "non-transitory"

should not be interpreted that the memory (302) is non-movable. In some examples, the memory (302) can be configured to store larger amounts of information than its storage space. In certain examples, a non-transitory storage medium may store data that can, over time, change (e.g., in Random Access Memory (RAM) or cache). The memory (302) can be an internal storage unit or it can be an external storage unit of the network clone apparatus (301), a cloud storage, or any other type of external storage.

The processor (304) may include various processing circuitry (as used herein, including the claims, the term "processor" may include various processing circuitry, including at least one processor, wherein one or more processors of the at least one processor may be configured to perform the various functions described herein) and is configured to execute instructions stored in the memory (302). The processor (304) may include a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (304) may include multiple cores to execute the instructions.

The communicator (303) may include various communication circuitry and is configured for communicating internally between hardware components in the system (300). Further, the communicator (303) is configured to facilitate communication between the system (300) and other devices via one or more networks (e.g. Radio technology). The communicator (303) includes an electronic circuit specific to a standard that enables wired or wireless communication.

The processor (304) is coupled with the network clone adaptor (305) and implemented by processing circuitry such as logic gates, integrated circuits, microprocessors, microcontrollers, memory (302) circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The network clone adaptor (305) includes an AI-based a network clone constructor (306), a solution receiver (307), and an AI-based network clone performance evaluator (308), each of which may include various processing circuitry and/or executable program instructions. The network clone adaptor (305) and the processor (304) may be integrally referred to as at least one processor.

The network clone constructor (306) constructs one or more AI-based network clones of one or more real network nodes in a wireless network. The one or more AI-based network clones mimics a data pattern and cell behavior of the one or more real network nodes. The solution receiver (307) receive a solution predicted by the AI server (120) to mitigate one or more problems associated with one or more services of the one or more real network nodes. In the AI-based network clone, a third AI model generated for each cell is used to mimic cell behavior of each real cell.

In an embodiment, traffic patterns collected from various cells, the traffic pattern can be extrapolated and generated for testing in the simulated environment.

The AI-based network clone performance evaluator (308) evaluates a performance of the one or more AI-based network clones by deploying the solution on the one or more AI-based network clones. Further, the AI-based network clone performance evaluator (308) determines whether the performance of the one or more AI-based network clones meet a SLA associated with one or more services of the one or more real network nodes.

The AI-based network clone performance evaluator (308) sends the solution to the one or more real network nodes through the SMO (130) for deployment when the performance of the one or more AI-based network clones meet the SLA associated with one or more services of the one or more real network nodes.

The AI-based network clone performance evaluator (308) sends a feedback including the performance of the solution to the AI server (120) for retraining when the performance of the one or more AI-based network clones does not meet the SLA associated with one or more services of the one or more real network nodes.

In an embodiment, the network clone apparatus (301) receives a request to create the one or more AI-based network clones from the AI server (120) upon detecting the one or more problems associated with one or more services of the one or more real network nodes. Further, the network clone apparatus (301) obtains real time data from the one or more real network nodes. The real time data is associated with to the one or more services of the one or more real network nodes to be evaluated. Further, the network clone apparatus (301) generates the data pattern of the one or more services to be evaluated by applying a second AI model on the real time data. The data pattern includes one or more of a traffic pattern, a number of users, and an amount of data traffic for different services. Further, the network clone apparatus (301) generates the cell behavior of the one or more services to be evaluated by applying the third AI model the real time data. Further, the network clone apparatus (301) creates the one or more AI-based network clones of the one or more real network nodes in the wireless network based on one or more of the data pattern and the cell the behavior.

In an embodiment, the network clone apparatus (301) includes deconstruct the AI based one or more AI-based network clones of the one or more real network nodes when the solution is sent to the one or more real network nodes for deployment.

In an embodiment, the network clone apparatus (301) is deployed in one or more of an independent network server, an ORAN server and a SON server.

The AI server (120) may include a real time data receiver (309) and a solution predictor (310) each of which may include various circuitry and/or executable program instructions.

The real time data receiver (309) obtains real time data from the one or more real network nodes. The real time data related to the one or more problems associated with the one or more services of the one or more real network nodes. The solution predictor (310) predicts the solution to mitigate the one or more problems associated with the one or more services of the one or more real network nodes by applying a first AI model on the real time data obtained from the one or more real network nodes.

FIG. 4 is a flowchart (400) illustrating an example method for evaluating network performance, according to various embodiments.

At 401, the network clone apparatus (301) constructs the one or more AI-based network clones of the one or more real network nodes in the wireless network. The one or more AI-based network clones mimics the data pattern and the cell behavior of the one or more real network nodes.

At 402, the network clone apparatus (301) receives the solution predicted by the AI server (120) to mitigate the one or more problems associated with the one or more services of the one or more real network nodes.

At 403, the network clone apparatus (301) evaluates the performance of the one or more AI-based network clones by deploying the solution on the one or more AI-based network clones.

At 404, the network clone apparatus (301) determines whether the performance of the one or more AI-based network clones meet the SLA associated with one or more services of the one or more real network nodes.

At 405, the network clone apparatus (301) sends the feedback including the performance of the solution to the AI server (120) for retraining.

At 406, the network clone apparatus (301) sends the solution to the one or more real network nodes for deployment.

The various actions, acts, blocks, steps, or the like in the method may be performed in the order presented, in a different order or simultaneously. Further, in various embodiments, some of the actions, acts, blocks, steps, or the like may be omitted, added, modified, skipped, or the like without departing from the scope of the disclosure.

Figure 5:
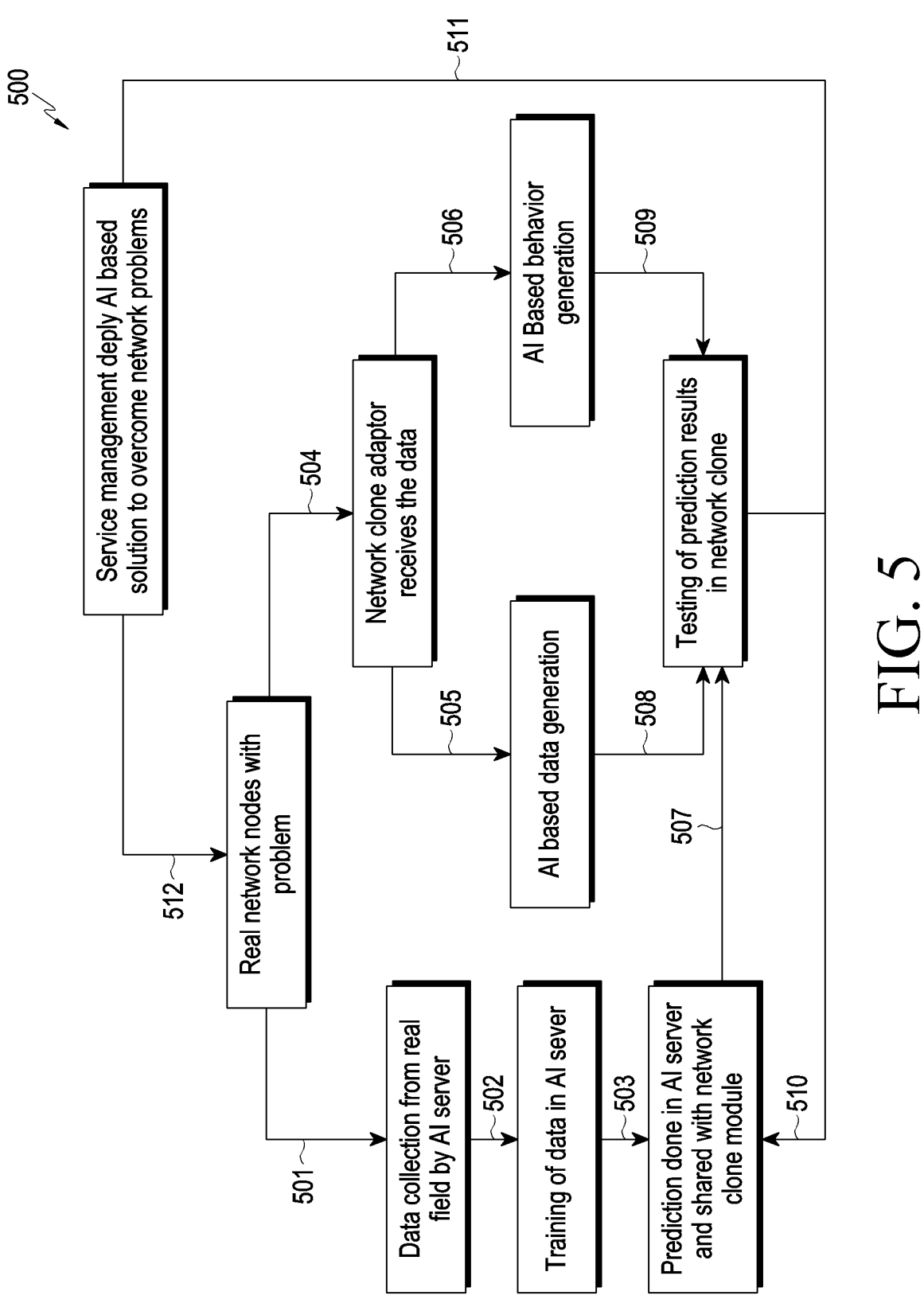
FIG. 5 is a diagram illustrating example network performance evaluation using AI-based network cloning, according to various embodiments.

FIG. 5 is a diagram (500) illustrating example network performance evaluation using AI based network cloning, according to various embodiments.

At 501, the AI server (120) receives real time data related to the real network nodes with problems. At 502, the collected real time data from the real network (110) are sent for training of the data in the first AI model. At 503, the AI server (120) predicts the solution to mitigate the problems associated with the service of the real network nodes by applying the first AI model on the real time data. At 507, the predicted solution is sent to the network clone apparatus (301).

At 504, the network clone apparatus (301) receives real time data related to the real network nodes with the problems. At 505, the network clone apparatus (301) generates the data pattern of services to be evaluated by applying the second AI model on the real time data. The data pattern includes but not limited to the traffic pattern, the number of users, and the amount of data traffic for different services. At 506, the network clone apparatus (301) generates the cell behavior of the services to be evaluated by applying the third AI model in the real time data.

At 508 and 509, the data pattern of service and cell behavior of the services are used for creating the clone of the network in the network clone apparatus (301). At 507, the AI server (120) sends the solution to mitigate the problems associated with the service of the real network nodes to the network clone apparatus (301).

At 510, the network clone apparatus (301) sends the feedback including the performance of the solution to the AI server (120) for retraining when the performance of the AI-based network clone does not meet the SLA associated with services of the real network node. At 511, the network cone apparatus (301) sends the predicted solution to the SMO for deployment when the performance of the one or more AI-based network clones meet the SLA associated with services of the real network nodes. At 512, the SMO sends the solution to the one or more real network nodes for deployment to mitigate the problems associated with services of the real network nodes.

Figure 6:
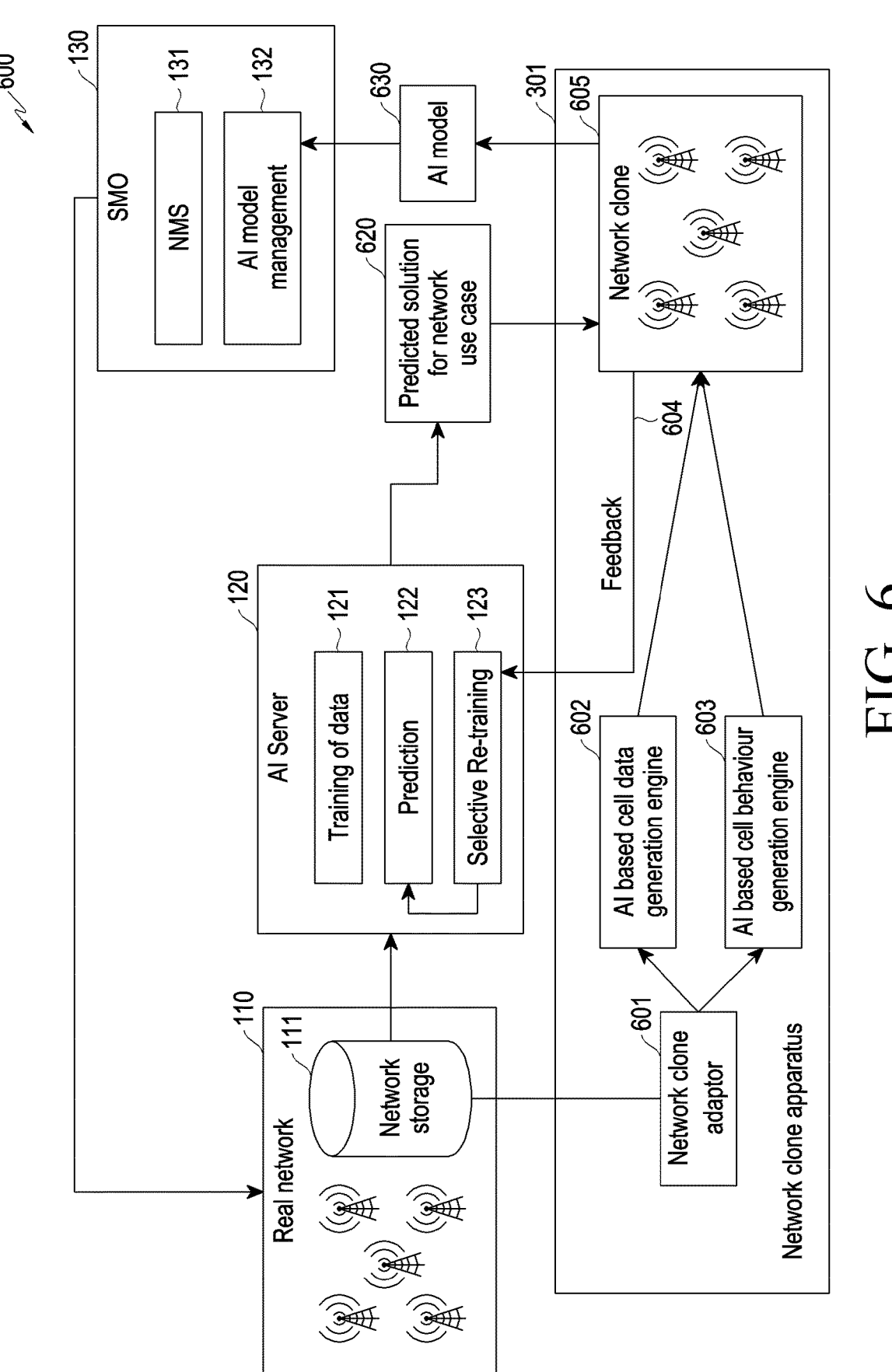
FIG. 6 is a diagram illustrating an example system for network performance evaluation and network anomaly, according to various embodiments.

FIG. 6 is a diagram illustrating an example configuration of a system (600) for network performance evaluation and network anomaly, according to an embodiment as disclosed herein.

The system (600) for network performance evaluation includes the real network (110) with plurality of real network nodes, the SMO (130) connected to the plurality of real network nodes, the AI server (120) connected to the plurality of real network nodes and the network clone apparatus (301) to perform AI based network cloning.

The real time data from real network (110) are collected in a network storage (111) and the real time data is sent to an AI server (120) according to a network problem or use case to be targeted. The real time data collected is trained at 121 in the AI server (120). After the training at 121 in the AI server (120) is completed, the AI server (120) predicts the solution at 122. At 123, the AI server (120) performs selective retraining of the first AI model. The SMO (130) includes the NMS (131) and an AI model management (132).

The AI server (120) obtains real time data from the real network node of the real network (110). The real time data related to the problems associated with the services of the real network nodes. At 620, the AI server (120) predicts the solution to mitigate the problems associated with the services of the one or more real network nodes by applying the first AI model on the real time data obtained from the real network nodes in the network clone (605).

A clone adaptor (601) obtains the real time data from the real network (110). An AI based Cell Data Generation Engine (602) generates the data pattern of the services to be evaluated by applying the second AI model on the real time data. The data pattern includes the traffic pattern, the number of users, and the amount of data traffic for different services. An AI based Cell behavior generation engine (603) generates the cell behavior of the services based on the Key Performance Indicators (KPIs) of cells (examples Physical Resource Block (PRB) utilization KPI) by applying the third AI model. The network clone (605) is created based on the data pattern and the cell behavior. The network clone (605) is also referred as AI-based network clone.

The predicted solution at 620 is implemented in the network clone (605). At 604, the network clone (605) sends the feedback including the performance of the solution to the AI server (120) for retraining when the performance of the one or more AI-based network clones does not meet the SLA associated with the services of the real network node.

The AI based Network cloning (610) sends the solution to the SMO (130) when the performance of the AI-based network clone meet the SLA associated with the services of the real network node. The SMO (130) sends the solution for deployment to the real network (110) to mitigate the problems. The network clone apparatus (301) is also referred AI based Network cloning (610)

Figure 7:
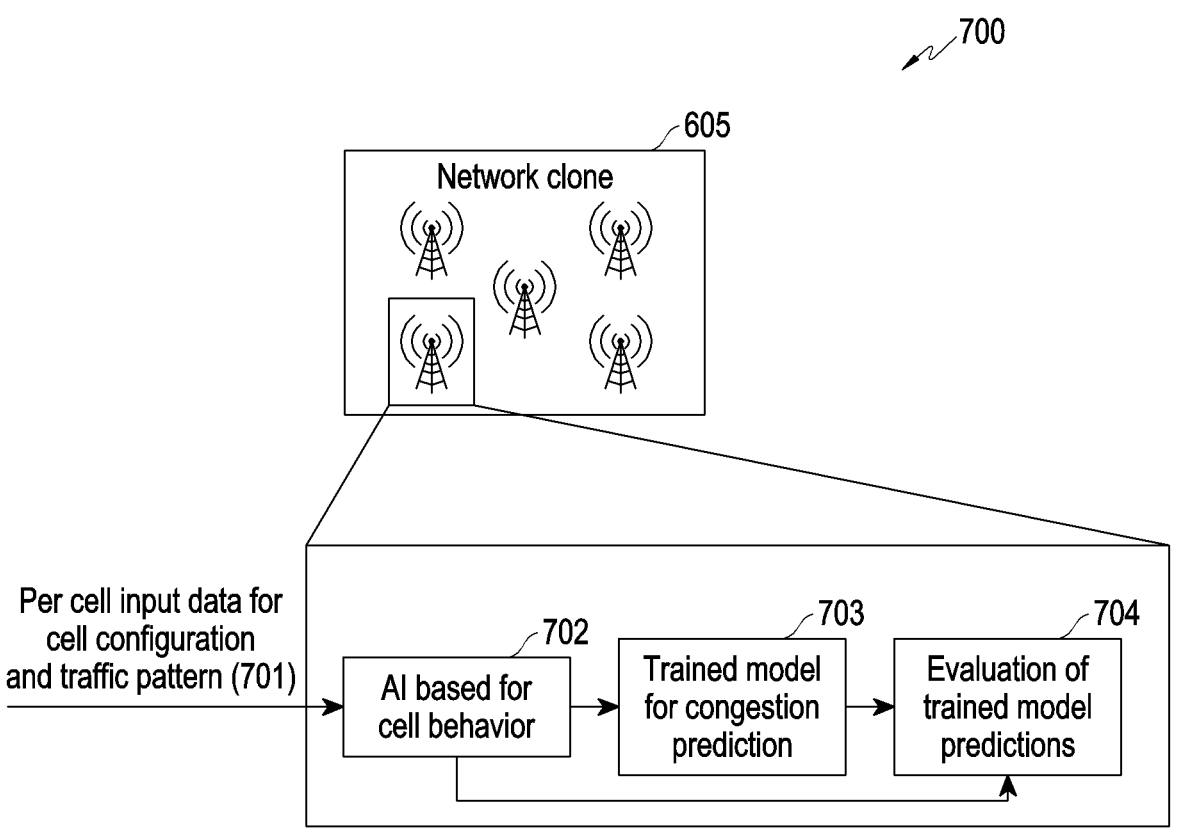
FIG. 7 is a diagram illustrating example congestion prediction and mitigation, according to various embodiments.

FIG. 7 is a diagram (700) illustrating example congestion prediction and mitigation, according to various embodiments.

A cell implementation inside the network clone (605) of the network clone apparatus (301) is referred in FIG. 7. At 701, the network clone (605) receives per cell input data for cell configuration and traffic pattern. At 702, the network clone apparatus (301) generates the third AI model for cell behavior. A KPI data includes but not limited to PRB utilization for previous N hours are shared with trained model for congestion prediction at 703. At 704, the KPI data includes but not limited to PRB utilization for N+1 hours are shared with evaluation of trained model predictions along with predicted PRB utilization for future N+1 hour.

At 702, the third AI model is deployed to mimic cell behavior for example generation of KPIs based on cell configuration and traffic pattern.

At 703, the first AI model that needs to be tested in the simulated environment for example the first AI model performs congestion prediction.

At 704, the evaluation of trained model predictions for example evaluate congestion predictions performed by the first AI model.

Figure 8A:
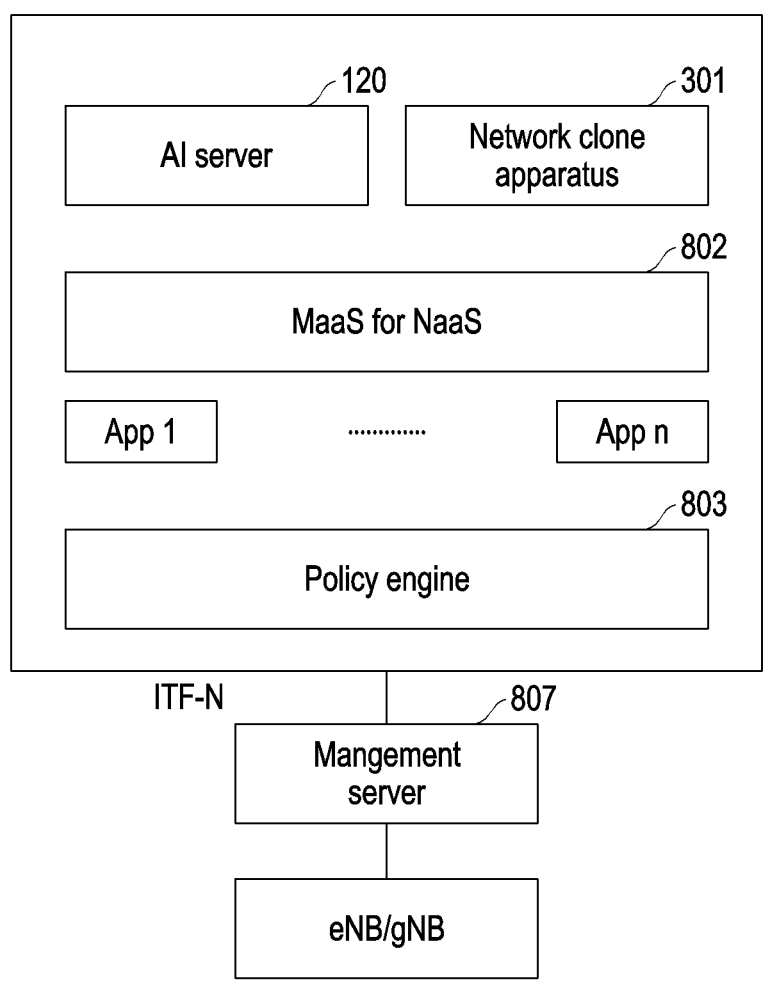
FIGS. 8A, 8B and 8C are diagrams illustrating example deployments of example methods and systems in different network architectures, according to various embodiments.
Figure 8B:
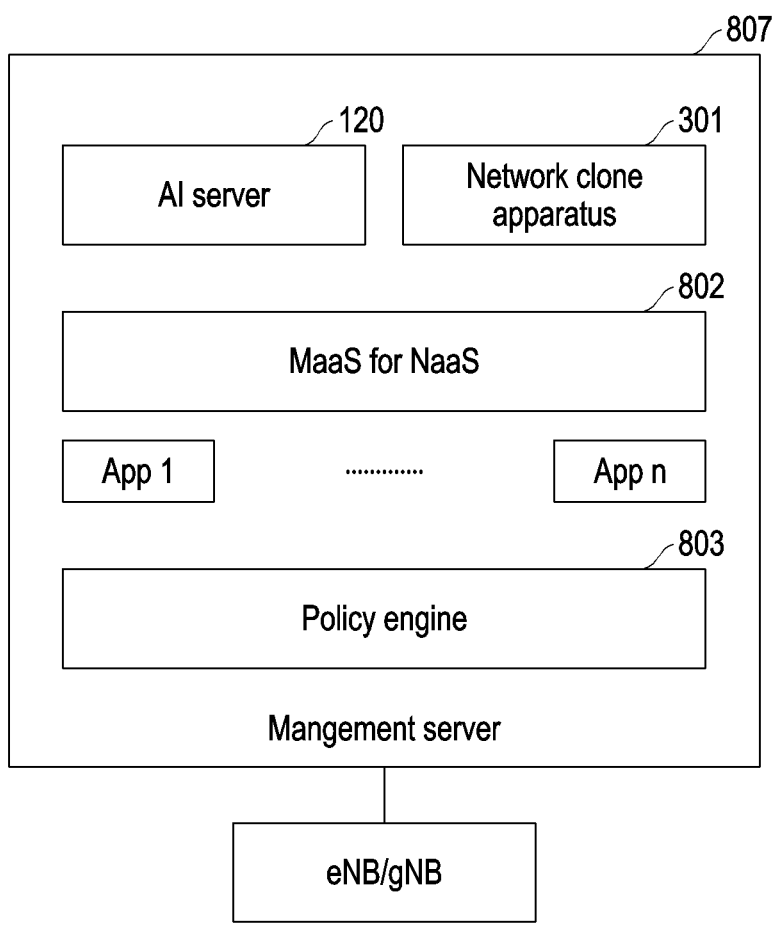
Figure 8C:
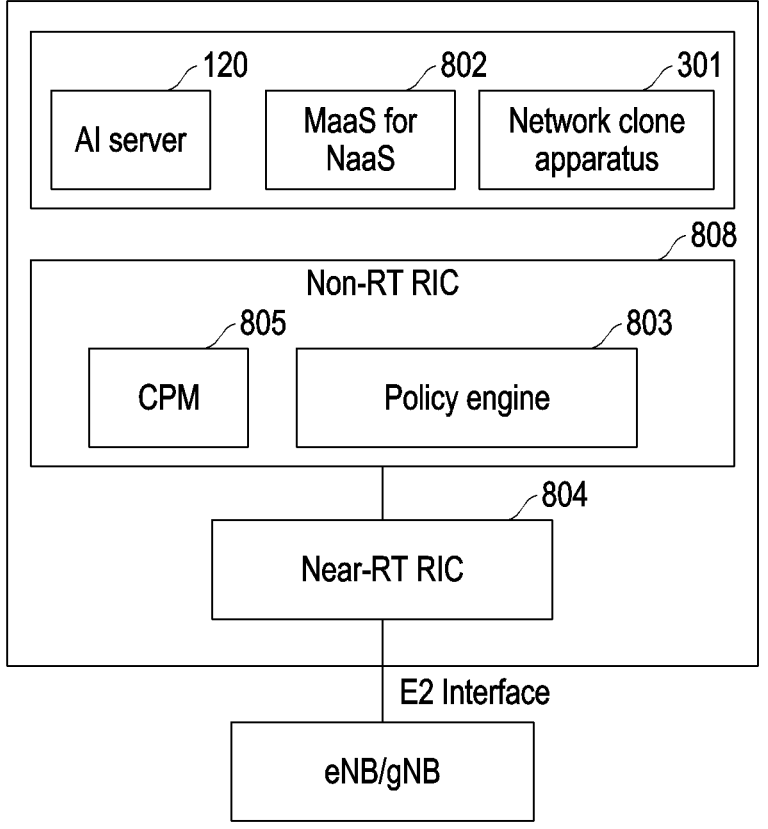

FIGS. 8A, 8B and 8C are diagrams illustrating example deployments of various example methods and the network clone apparatus (301) in different network architectures, according to various embodiments.

Referring to FIG. 8A, the disclosed method and the network clone apparatus (301) is part of an independent proprietary server solution in which the disclosed method and the network clone apparatus (301) provide AI as a service and a Monitoring as a Service (MaaS) for Network as a Service (NaaS) at 802 can further optimize and automate this AI service using a policy engine (803).

Referring to FIG. 8B, the disclosed method and the network clone apparatus (301) is part of management server (807) that is planned to be upgraded with Intelligent AI solutions.

Referring to FIG. 8C, the disclosed method and the network clone apparatus (301) is part of Open-Radio Access Network (O-RAN) solution and co-exist with the AI server (120) similar to FIG. 8A and interact with Non-Real-Time RAN Intelligent Controller (RT RIC) or Near-RT RIC at 804 to further optimize the AI solutions.

The disclosed method and the network clone apparatus (301) may include the following advantages:

1. Automatic AI/ML platform, enabling the formation of network clones automatically without the intervention of the operators.
2. The resources used to create clones will be released once the performance evaluation is complete making the system resource efficient.
3. Best available training models is selected and the disclosed system is feasible in terms of Accuracy and efficiency due to deployment of techniques like GAN, dynamic deep learning, and reinforcement based AI techniques.
4. Optimized ML services for telecommunication companies by automating the process of performance evaluation and making it intelligent with the help of advanced AI techniques.
5. No error in the real field as the AI-based network problem mitigation solutions is first evaluated in automated network clone environment before the actual deployment.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for network performance evaluation using artificial intelligence-based (AI-based) network cloning by a network apparatus, the method comprising:

constructing at least one AI-based network clone of at least one network node in a wireless network, wherein the at least one AI-based network clone is configured to mimic a data pattern and cell behavior of the at least one network node;

receiving a solution predicted by an AI server to mitigate at least one network performance problem associated with at least one service of the at least one network node;

evaluating a performance of the at least one AI-based network clone by deploying the solution on the at least one AI-based network clone;

determining whether the performance of the at least one AI-based network clone meets a Service Level Agreement (SLA) associated with at least one service of the at least one network node; and sending the solution to the at least one network node for deployment based on the performance of the at least one AI-based network clone meeting the SLA associated with at least one service of the at least one network node; and sending a feedback including the performance of the solution to the AI server for retraining based on the performance of the at least one AI-based network clone not meeting the SLA associated with at least one service of the at least one network node.

2. The method of claim 1, wherein constructing the at least one AI-based network clone of the at least one network node in the wireless network comprises:

receiving a request to create the at least one AI-based network clone from the AI server upon detecting the at least one problem associated with at least one service of the at least one network node;

obtaining real time data from the at least one network node, wherein the real time data is associated with to the at least one service of the at least one network node to be evaluated;

generating the data pattern of the at least one service to be evaluated by applying a second AI model on the real time data, wherein the data pattern comprises at least one of a traffic pattern, a number of users, an amount of data traffic for different services;

generating the cell behavior of the at least one service to be evaluated by applying a third AI model the real time data;

creating the at least one AI-based network clone of the at least one real network node in the wireless network based on at least one of the data pattern and cell behavior.

3. The method of claim 1, wherein the solution to mitigate the at least one problem associated with the at least one service of the at least one real network node is predicted by the AI server by applying a first AI model on real time data obtained from the at least one network node.

4. The method of claim 1, further comprising deconstructing the at least one AI-based network clone of the at least one real network node based on the solution being sent to the at least one real network node for deployment.

5. The method of claim 1, wherein the network apparatus is deployed in at least one of an independent network server, an open radio access network (ORAN) server, and a self organizing network (SON) server.

6. A network apparatus for network performance evaluation using artificial intelligence-based (AI-based) network cloning, the network apparatus comprising:

memory storing instructions; and at least one processor comprising processor circuitry coupled to the memory, wherein the instructions, when executed by the at least one processor, individually and/or collectively, cause the network apparatus to:

construct at least one AI-based network clone of at least one network node in a wireless network, wherein the at least one AI-based network clone is configured to mimic a data pattern and cell behavior of the at least one network node;

receive a solution predicted by an AI server to mitigate at least one network performance problem associated with at least one service of the at least one network node;

evaluate a performance of the at least one AI-based network clone by deploying the solution on the at least one AI-based network clone;

determine whether the performance of the at least one AI-based network clone meets a service level agreement (SLA) associated with at least one service of the at least one network node;

send the solution to the at least one network node for deployment based on the performance of the at least one AI-based network clone meeting the SLA associated with at least one service of the at least one network node; and send a feedback including the performance of the solution to the AI server for retraining based on the performance of the at least one AI-based network clone not meeting the SLA associated with at least one service of the at least one network node.

7. The network apparatus of claim 6, wherein for constructing the at least one AI-based network clone of the at least one network node in the wireless network, the instructions, when executed by the at least one processor, individually and/or collectively, cause the network apparatus to:

receive a request to create the at least one AI-based network clone from the AI server upon detecting the at least one problem associated with at least one service of the at least one network node;

obtain real time data from the at least one network node, wherein the real time data is associated with to the at least one service of the at least one network node to be evaluated;

generate the data pattern of the at least one service to be evaluated by applying a second AI model on the real time data, wherein the data pattern comprises at least one of a traffic pattern, a number of users, an amount of data traffic for different services;

generate the cell behavior of the at least one service to be evaluated by applying a third AI model the real time data;

create the at least one AI-based network clone of the at least one real network node in the wireless network based on at least one of the data pattern and cell behavior.

8. The network apparatus of claim 6, wherein the solution to mitigate the at least one problem associated with the at least one service of the at least one real network node is predicted by the AI server by applying a first AI model on real time data obtained from the at least one network node.

9. The network apparatus of claim 6, wherein the instructions, when executed by the at least one processor, individually and/or collectively, cause the electronic device to deconstruct the at least one AI-based network clone of the at least one real network node based on the solution being sent to the at least one real network node for deployment.

10. The network apparatus of claim 6, wherein the network apparatus is deployed in at least one of an independent network server, an open radio access network (ORAN) server, and a self organizing network (SON) server.

11. A non-transitory computer-readable storage medium storing instructions which, when executed by at least one processor comprising processor circuitry of a network apparatus, causes the network apparatus to perform operations, the operations comprising:

constructing at least one artificial intelligence-based (AI-based) network clone of at least one network node in a wireless network, wherein the at least one AI-based network clone is configured to mimic a data pattern and cell behavior of the at least one network node;

receiving a solution predicted by an AI server to mitigate at least one network performance problem associated with at least one service of the at least one network node;

evaluating a performance of the at least one AI-based network clone by deploying the solution on the at least one AI-based network clone;

determining whether the performance of the at least one AI-based network clone meets a Service Level Agreement (SLA) associated with at least one service of the at least one network node; and sending the solution to the at least one network node for deployment based on the performance of the at least one AI-based network clone meeting the SLA associated with at least one service of the at least one network node; and sending a feedback including the performance of the solution to the AI server for retraining based on the performance of the at least one AI-based network clone not meeting the SLA associated with at least one service of the at least one network node.

12. The non-transitory computer-readable storage medium of claim 11, wherein constructing the at least one AI-based network clone of the at least one network node in the wireless network comprises:

receiving a request to create the at least one AI-based network clone from the AI server upon detecting the at least one problem associated with at least one service of the at least one network node;

obtaining real time data from the at least one network node, wherein the real time data is associated with to the at least one service of the at least one network node to be evaluated;

generating the data pattern of the at least one service to be evaluated by applying a second AI model on the real time data, wherein the data pattern comprises at least one of a traffic pattern, a number of users, an amount of data traffic for different services;

generating the cell behavior of the at least one service to be evaluated by applying a third AI model the real time data;

creating the at least one AI-based network clone of the at least one real network node in the wireless network based on at least one of the data pattern and cell behavior.

13. The non-transitory computer-readable storage medium of claim 11, wherein the solution to mitigate the at least one problem associated with the at least one service of the at least one real network node is predicted by the AI server by applying a first AI model on real time data obtained from the at least one network node.

14. The non-transitory computer-readable storage medium of claim 11, wherein the operations further comprises deconstructing the at least one AI-based network clone of the at least one real network node based on the solution being sent to the at least one real network node for deployment.

15. The non-transitory computer-readable storage medium of claim 11, wherein the network apparatus is deployed in at least one of an independent network server, an open radio access network (ORAN) server, and a self organizing network (SON) server.

* * * * *